United States Patent [19]

Rusco et al.

[11] Patent Number: 5,193,302
[45] Date of Patent: Mar. 16, 1993

[54] BUG TRAP

[76] Inventors: Harvey H. Rusco, 308 Sixth Ave., Box 485, Ironton, Minn. 56455; Donald J. Stealy, 1010 Birch St., Crosby, Minn. 56441

[21] Appl. No.: 822,073

[22] Filed: Jan. 17, 1992

[51] Int. Cl.$^5$ ............................................. A01M 1/10
[52] U.S. Cl. ...................................... 43/107; 43/121
[58] Field of Search .................. 43/121, 107, 118, 109

[56] References Cited

U.S. PATENT DOCUMENTS

| | | | |
|---|---|---|---|
| 234,976 | 11/1880 | Gibble | 43/118 |
| 598,521 | 2/1898 | Karr | 43/121 |
| 1,791,145 | 2/1931 | Rawlings | 43/121 |
| 2,162,502 | 6/1939 | Goulard | 43/107 |
| 3,341,967 | 9/1967 | Kelley | 43/121 |
| 4,400,905 | 8/1983 | Brown | 43/121 |

FOREIGN PATENT DOCUMENTS

| | | | |
|---|---|---|---|
| 151829 | 9/1903 | Fed. Rep. of Germany | 43/109 |
| 15435 | of 1887 | United Kingdom | 43/109 |
| 15420 | of 1899 | United Kingdom | 43/114 |

OTHER PUBLICATIONS

Handy Home Manual, 1935, p. 60, Garden Hints.
Popular Science, Jun. 1943, pp. 232, 233.

Primary Examiner—Kurt C. Rowan
Attorney, Agent, or Firm—Burd, Bartz & Gutenkauf

[57] ABSTRACT

A bug trap having the appearance of a plant and being comprised as an artificial plant having stems with interior tubular passages connected at one end to a bug receptacle and having at the other end flower-type blossoms for attracting the bugs. Bugs are attracted to the blossom and then are trapped in the tubular stem whereby they eventually make their way to the bug receptacle. The blossoms carry a plurality of filament type members which are sufficient in number and closely located to permit the bug to enter the blossom but prevent its retreat. The filament type members are connected at one end to interior surfaces of the blossom and extend toward the tubular passage of the stem. The blossom can carry an odor bait to attract bugs. The receiptacle can include a disposable plastic bag that is removed from time to time for disposition of the trapped bugs.

10 Claims, 1 Drawing Sheet

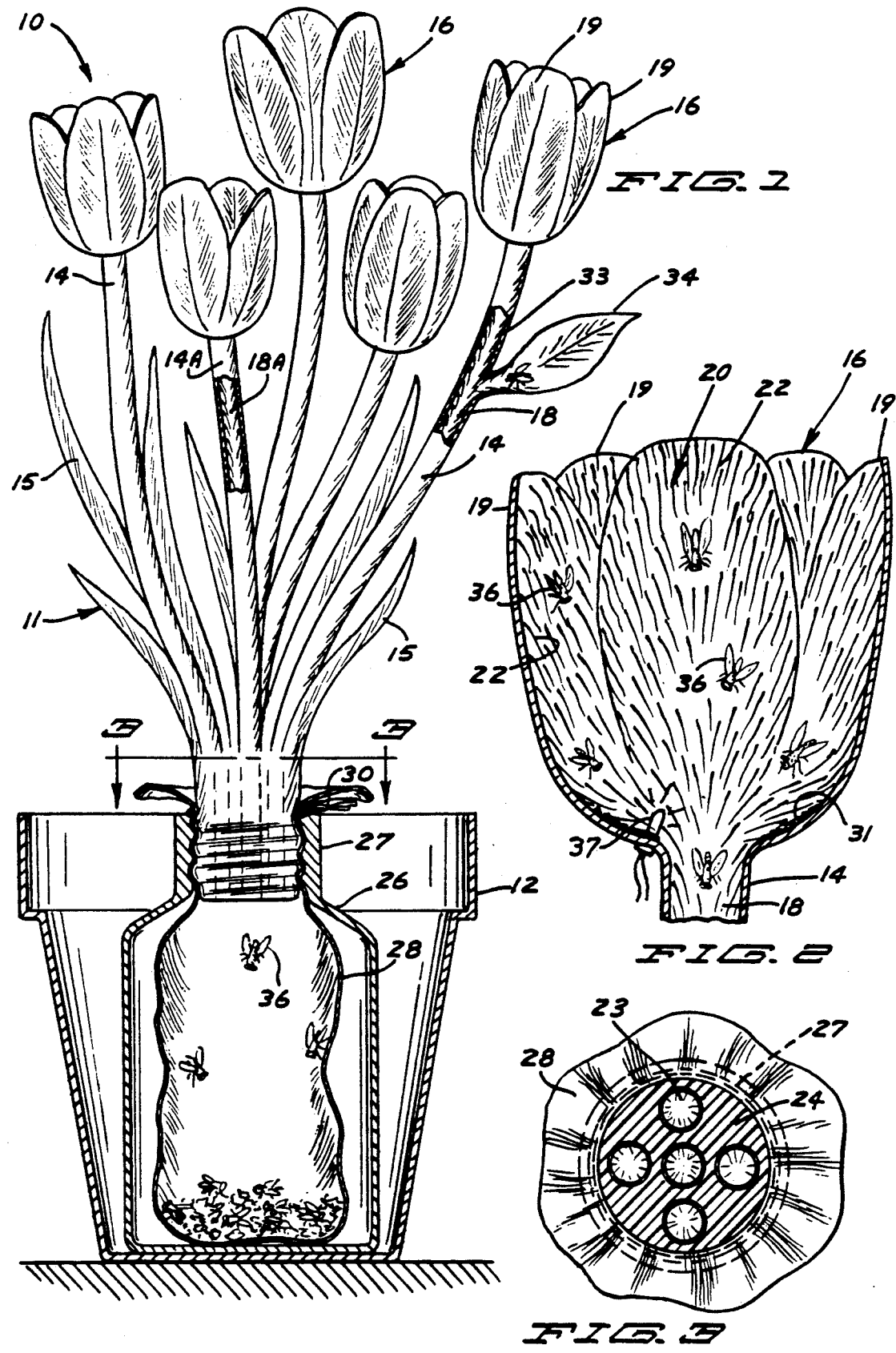

BUG TRAP

BACKGROUND OF THE INVENTION

Certain insects and insect-like invertebrate, collectively known as bugs, can be a nuisance to humans as being a mild irritation, biting and carrying harmful bacteria. Attempted control of bug population takes various forms and achieves varying degrees of success. Insecticides are found to be objectionable, particularly in closed rooms.

SUMMARY OF THE INVENTION

The present invention comprises a new and improved bug trap having the form of an artificial plant taking advantage of the natural attraction of bugs to vegetation and at the same time providing an asthetically pleasing structure. The trap includes an artificial plant mounted in a pot. The plant has one or more tubular stems upwardly terminating in a blossom-type structure such as an open flower bulb. The blossom has internal structure such as petals that carry an array of inwardly projected resilient barbs or prongs that surround the blossom opening in sufficient number and position to allow passage of the bug and prevent retreat. The blossom opening leads to the tubular passage of the stem. The lower end of the stem is connected to a bug receptacle which can be hidden in or be comprised as part of the plant pot. The receptacle is removable from the end of the stem and is preferably disposable such as a plastic bag. The bug is attracted to and enters the blossom opening. The prongs prevent the bug from retreating. The bug moves forward along the tubular stem and into the bug receptacle where is is trapped. In order to attract the bug more readily, the blossom can be odor baited such as with a sugar-water solution.

IN THE DRAWINGS

FIG. 1 is a side elevational view of a bug trap according to the invention partially in section for purposes of illustration and showing bugs being trapped therein;

FIG. 2 is an enlarged sectional view of an artificial flower blossom of the bug trap in FIG. 1; and FIG. 3 is an enlarged sectional view of a portion of the bug trap of FIG. 1 taken along the line 3—3 thereof.

DESCRIPTION OF A PREFERRED EMBODIMENT

Referring to the drawings, there is shown in FIG. 1 a bug trap indicated generally at 10 disguised as an artificial plant and including an artificial plant 11 situated in a plant pot 12. The artificial plant 11 includes a plurality of generally upwardly extending tubular artificial stems 14 and decorative artificial leaves 15. At one end of the stems 14 are artificial blossoms 16 shown constituted as outwardly open flow blossoms. Artificial plant 11 has the outward appearance of a genuine plant that could be a flower plant or other popular form of indoor or outdoor plants of the type that normally attract bugs.

The stems 14 are tubular having rtubular passageways 18. The blossoms 16 are comprised of a plurality of overlapping petals 19 defining a blossom chamber 20. The blossom chamber 20 of each flower is open to the corresponding tubular passageway 18 of the stem 14. The interior surfaces of the petals 19 are covered with downwardly or inwardly orientated resilient prongs constituted as cilia or filament type members 22. Filaments 22 are fixed at one end to the inside surfaces of blossoms 16 and point generally toward the passageway 18 of the stem 14. Filaments 22 are of sufficient number and purposefully constructed and relatively arranged to allow passage of an insect into the tubular passageway 18 of stem 14 but prevent retreat of the insect. Once the insect has penetrated deeply enough into the chamber 20 of the blossom 16, the filaments 22 prevent its escape. Filaments 22 deflect sufficiently in the direction toward the passwageway 18 to permit passage of the insect. Once the insect is past, the filament returns to its original position. Upon attempting to retreat, the insect is confronted with a barrage of the filaments 22 preventing its escape. The insect can only proceed in a direction toward and into the passageway 18.

The opposite or lower ends of the stems 14 are situated in mounting openings 23 of a holder 24 (FIG. 3). Holder 23 is generally cylindrical with an exterior thread on the side wall thereof. A receptacle or jar 26 or plastic or glass or the like has a neck 27 with interior threads corresponding to those of the holder 24. Holder 24 is threadably assembled in the neck 27 of the jar 26. A disposable plastic bag 28 can be slipped over the holder 27 such that the neck of the bag 28 is located between the holder 24 and the neck 27 of the jar 26 with the body of the bag disposed within the jar 26. Bag 28 is held between the threads of holder 24 and neck 27. Openings 23 of the holder 24 permit communication between the passageways 18 of the stems 14 and the interior of the jar 26. A drawstring 30 can be provided around the neck of the bag 28 for purposes of closing it once it is removed from the holder 24. The jar 26 is situated in the plant pot 12 for purposes of concealment.

An odor bait 31 can be placed in or around the blossom 16, as by being deposited in the blosssom chamber 20. Bait 31 can be some substance that is attractive to the insects such as sugar or a sugar-water solution, syrup, or the like. The blossoms can be of various colors such as yellow or red to simulate actual flowers.

The internal diameters of the passageways 18 of the stems 14, 14A can be of various diameters according to the size of the intended bug or insect to be trapped. For example, a stem 14A can have a passageway 18A that is narrower than another stem 14 having a passageway 18. The passageway 18A can be of a smaller size so as to trap mosquitos, whereas another larger stem 14 can have a larger passageway 18 for trapping bees, beetles, or larger insects. In addition, the interior surfaces of the passageways 18 can be lined with additional filaments 33 to inhibit movement of a bug trying to retreat.

Artificial leaves 34 can be attached to the stem 14 at an intermediate position thereof and enter into the passageway 18 for trapping additional bugs. The plant could be partially illuminated by a light 37 to further attract bugs. Light 37 can be located in a blossom or exterior thereto.

In use of the bug trap, it is placed at a location where it is desired to clear the area of certain insects or the like. This may be indoors or outside. The intended bug victim has a natural attraction to the artificial plant. The addition of an odor bait 31 can enhance the attractiveness of the plant to the bug. The bugs such as flies 36 enter the chamber 20 of the blossom 16. The petals 19 and other artificial flower-type structure carry the filaments 22 and are closely spaced so that the resilient filaments 22 form a confining network over the chamber 20 permitting one-way passage toward the passageway 18 of the stem 14. The fly is trapped therein and cannot retreat. Accordingly, the fly progresses in an apparently forward direction into the passageway 18 and eventually falls into the container 26 in the disposable bag 28. Periodically, the bag 28 is removed from the jar 26 and removed from the holder 24. The drawstring 30 is drawn about the neck of the bag to close it and the bag is disposed of. In some cases, such as where bees are being trapped, it may be desirable to take the bag 28 to a remote location and release the contents.

The embodiments of the invention in which an exclusive property or privilege is claimed are defined as follows:

1. A bug trap disguised as a plant comprising:
   an artificial plant having at least one tubular artificial stem having a tubular passage between first end thereof and a second end;
   a bug receptacle connected to one end of the stem;
   an artificial blossom connected to the stem to attract bugs, said blossom having outwardly open interior surfaces;
   a plurality of resilient filament type members located on the interior surfaces of the blossom connected at one end to the blossom and inwardly directed toward the tubular passage of the stem, said filament type members being sufficient in number and arranged in close proximity to one another to permit passage of a bug through the blossom into the tubular passage of the stem but prevent retreat of the bug from the blossom.

2. The bug trap of claim 1 wherein said artificial plant includes a plurality of tubular stems connected at one end to the bug receptacle, and a corresponding plurality of blossoms located at the opposite ends of the stems.

3. The bug trap of claim 2 wherein said artificial blossoms are comprised as artificial flower blossoms.

4. The bug trap of claim 2 including a stem holder having a plurality of openings corresponding to the plurality of stems, said stem ends fixed in the openings in the holder, said bug receptacle including a jar with an open neck, said holder of a size and shape to fit in and close the open end of the jar.

5. The bug trap of claim 4 wherein said stem holder has a generally cylindrical side wall with an exterior thread, said jar neck having an interior thread, said holder being threadably engaged in the neck of the jar.

6. The bug trap of claim 5 including a disposable plastic bag having a neck surrounding the stem holder and being lodged between the exterior threads of the stem holder and interior threads of the neck of the jar for collection of bugs therein.

7. The bug trap of claim 6 including an odor bait located on the artificial plant in order to attract bugs.

8. The bug trap of claim 7 including a light connected to the artificial plant in order to attract bugs.

9. The bug trap of claim 2 including a plurality of resilient filament type members located on the interior surfaces of the stems connected at one end to the stems and inwardly directed toward the bug receptacle.

10. A bug trap disguised as a plant comprising:
    an artificial plant having tubular passage between the first end and the second end;
    blossom means at the first end of the stem means being outwardly open and having a blossom chamber connected to the tubular passage of the stem means;
    a bug receptacle located at the opposite end of the stem means;
    filament means located in the chamber of the blossom means connected thereto and extending inwardly toward the tubular passage of the stem means and being closely spaced and positioned and sufficient in number to permit passage of a bug through the blossom means to the tubular passage of the stem means and prevent retreat of the bug from the blossom.

* * * * *

UNITED STATES PATENT AND TRADEMARK OFFICE
CERTIFICATE OF CORRECTION

PATENT NO. : 5,193,302
DATED : March 16, 1993
INVENTOR(S) : HARVEY H. RUSCO It is certified that error appears in the above-identified patent and that said Letters Patent is hereby corrected as shown below:

Col. 1, line 60 "rtubular" should be ---tubular---.

Col. 4, line 22 after "tubular" insert ---stem means with the first end and a second end and a tubular---.

Signed and Sealed this

Fourteenth Day of December, 1993

*Attest:*

BRUCE LEHMAN

*Attesting Officer*  *Commissioner of Patents and Trademarks*